United States Patent Office 3,506,732
Patented Apr. 14, 1970

3,506,732
CYCLIC DIENE ADSORPTION WITH ACTIVATED ZINC OXIDE-SILICA-ALUMINA ADSORBENTS
Don E. Crowley and Donald C. Tabler, Bartlesville, Okla., assignors to Phillips Petroleum Company, a corporation of Delaware
No Drawing. Filed Oct. 14, 1968, Ser. No. 767,471
Int. Cl. C07c 7/12; B01j 11/06
U.S. Cl. 260—681.5
6 Claims

ABSTRACT OF THE DISCLOSURE

Removal of cyclic dienes from streams containing open chain dienes by adsorption with activated zinc oxides. Specifically, cyclopentadiene is adsorbed from isoprene streams with an activated zinc oxide-silica-alumina adsorbent.

Background of the invention

This invention relates to the removal of cyclic dienes from streams containing same. In accordance with another aspect, this invention relates to the removal of cyclic dienes from streams containing open chain dienes by adsorption with activated zinc oxides. In accordance with a further aspect, this invention relates to the removal of cyclopentadiene from isoprene-containing streams by contacting the stream with an activated zinc oxide containing a major proportion of zinc oxide with the remainder being silica and alumina. In accordance with a further aspect, this invention relates to the contacting of isoprene-containing streams which also contain cyclopentadiene as an impurity in the liquid phase through an adsorption column containing a bed of activated zinc oxide.

Hydrocarbon mixtures containing undesirable materials are known. For example, in the manufacture of diolefins such as butadiene, isoprene and piperylene, unsaturated cyclic compounds are also produced and can be recovered along with the desirable diolefins. Diolefins are extensively employed as charge stocks in polymerization processes. When the polymerization processes are carried out in the presence of certain well known catalyst systems, the presence of even small amounts of cyclic dienes in admixture with the diene to be polymerized has a tendency to reduce the yield of polymer and decrease catalyst life. Accordingly, it is desirable in such cases to substantially reduce the amount of cyclic diene in the charge mixture prior to polymerization.

In accordance with the invention, it has been found that cyclic dienes can be removed effectively and selectively from mixtures containing same by adsorption.

Accordingly, it is an object of this invention to provide an improved process for the recovery of cyclic dienes from mixtures containing same.

A further object of this invention is to provide a novel adsorbent that is selective for the removal of cyclic dienes.

Other objects and aspects as well as the several advantages of the invention will be apparent to those skilled in the art upon reading the disclosure and the appended claims.

Summary of the invention

In accordance with the invention, cyclic dienes are removed from streams containing same including open chain dienes by contacting with an activated zinc oxide to selectively adsorb the cyclic dienes.

In accordance with one embodiment of the invention, cyclopentadiene is removed from mixtures thereof with isoprene by selectively adsorbing cyclopentadiene on activated zinc oxide.

In accordance with another embodiment of the invention, cyclopentadiene is removed from mixtures thereof with isoprene by contacting in liquid phase with an activated zinc oxide by adsorption and passing the mixture through an adsorption column containing a bed of activated zinc oxide.

The zinc oxide employed as adsorbent according to the invention comprises a major proportion of zinc oxide with the remainder being silica and alumina.

Description of preferred embodiments

The zinc oxide adsorbents that can be employed according to the invention can be either naturally occurring or can be synthetically prepared by suitable techniques. Minor amounts of other materials such as silica and alumina can be present, but the material is principally zinc oxide. One presently preferred zinc oxide composition that can be employed contains from 70 to 90 weight percent zinc oxide, about 6 weight percent $Al_2O_3$, and about 10 weight percent $SiO_2$.

Depending upon the contacting technique used for the adsorption, the activated zinc oxide can be in the form of pellets, extrudates, agglomerates, or even a fine powder.

Before use in the adsorption process, zinc oxide is activated in a suitable manner such as by heating in a flowing stream of an inert gas such as nitrogen for about 1 to about 30 hours at 500 to about 1500° F., preferably 600 to about 1200° F.

Regeneration of spent zinc oxide adsorbent is generally accomplished by techniques known in the art, such as by desorption with a liquid diluent, inert gas, steam, and the like.

In the preferred contacting operation, the liquid diene mixture is passed through a bed of the zinc oxide adsorbent. However, it will be understood that other contacting techniques could be employed, such as, for example, mixing the zinc oxide adsorbent in particle form with the liquid diene mixture. Generally, the contacting operation will be carried out at a temperature from about atmospheric temperature to about 250° F. or higher. Usually it will be most convenient to carry out the contacting operation at about the same temperature as the diene solution obtained from a previous reaction or other source thereby avoiding additional heat exchange of the diene mixture.

For best results, it is preferred to pass the diene mixture in liquid phase through a bed of zinc oxide at a rate not exceeding about 5 volumes of mixture per volume of zinc oxide per hour. This gives sufficient time for complete adsorption. However, if the mixture is run through faster, the product may still be acceptable, but it is preferred to obtain the maximum removal of cyclic diene impurities. Running the mixture through the zinc oxide more slowly does not have any detrimental effect, but is not ordinarily necessary.

In actual operation, the adsorbent can be in one or more beds in separate zones or a plurality of adsorbent contactors can be employed in parallel. For example, one adsorbent bed containing zinc oxide can be in actual operation removing cyclic dienes from open chain dienes while another bed is being regenerated upon completion of an adsorption run. Additional adsorbent chambers can be employed as desired, as is well known in the art.

As indicated previously, the invention is particularly applicable to the removal of cyclic dienes from streams containing same which also contain open chain dienes. One specific stream that has been successfully purified by the adsorbent of the invention is an isoprene stream containing cyclopentadiene. Other streams can be purified according to the invention and these include butadiene derived by cracking naphtha. Such a butadiene product contains small amounts of cyclopentadiene that are more economically removed by adsorption using zinc oxide than by distillation. Hexadiene may also be purified of cyclohexadienes by zinc oxide adsorption.

EXAMPLE I

An isoprene stream containing 1,000 p.p.m. cyclopentadiene was passed through an adsorbent bed containing 100 grams of activated zinc oxide under liquid phase ambient conditions. The activated zinc oxide contained about 6 weight percent $Al_2O_3$, about 10 weight percent $SiO_2$ and the remainder being zinc oxide, plus trace amounts of impurities. The catalyst was activated by heating in a nitrogen atmosphere at a temperature of 1000° F. for 6 to 12 hours.

A vertical column containing the zinc oxide adsorbent bed was used wherein the impure isoprene stream was percolated through the bed of zinc oxide in a conventional adsorption purification technique.

It was found that the zinc oxide was selective in the removal of cyclopentadiene in that the amount of cyclopentadiene in the effluent was less than 1 p.p.m. The capacity of the activated zinc oxide was 0.175 gram cyclopentadiene per 100 grams of adsorbent.

EXAMPLE II

Further runs were carried out with an isoprene stream containing cyclopentadiene wherein the amount of cyclopentadiene present was 1.5 weight percent. The activated zinc oxide containing silica and alumina in amounts as defined in Example I effectively removed the cyclopentadiene to essentially zero levels. The control using zinc oxide produced by calcining pure zinc carbonate exhibited no adsorptive capacity for cyclopentadiene. The surface area for the activated zinc oxide of Example I was 25 $m^2$/gram (square meters per gram) while that of the zinc oxide obtained by calcining zinc carbonate was only 8 $m^2$/gram.

We claim:
1. A process for the removal of cyclic dienes from streams containing same and open chain dienes which comprises contacting at a temperature of about atmospheric temperature to about 50° F. a feed stream containing open chain dienes and cyclic dienes with an activated zinc oxide adsorbent consisting essentially of 70–90 weight percent zinc oxide and the remainder silica and alumina which selectively adsorbs the cyclic dienes in the presence of open chain dienes, said adsorbent having been activated by heating in a flowing stream of an inert gas for about 1 to about 30 hours at 500 to about 1500° F.

2. A process according to claim 1 wherein the contacting is effected in liquid phase and at atmospheric temperature conditions.

3. A process according to claim 1 wherein the feed stream is passed through a fixed bed of activated zinc oxide under liquid phase conditions at a rate not exceeding about 5 volumes of feed stream per volume of zinc oxide adsorbent per hour.

4. A process according to claim 1 wherein said cyclic diene is cyclopentadiene and said open chain diene is isoprene.

5. A process according to claim 1 wherein said activated zinc oxide adsorbent contains 84 weight percent zinc oxide, 6 weight percent alumina and 10 weight percent silica.

6. A process according to claim 5 wherein said activated zinc oxide adsorbent is activated prior to use by heating in a stream of nitrogen at a temperature of 1000° F. for 6 to 12 hours.

References Cited

UNITED STATES PATENTS

| 2,189,058 | 2/1940 | Day | 208—257 X |
| 3,439,060 | 4/1969 | Kempton | 260—681.5 |

DELBERT E. GANTZ, Primary Examiner

G. E. SCHMITKONS, Assistant Examiner

U.S. Cl. X.R.

252—455, 457